US011206935B2

(12) United States Patent
Yu et al.

(10) Patent No.: US 11,206,935 B2
(45) Date of Patent: Dec. 28, 2021

(54) WALL-MOUNTED STRUCTURE AND ELECTRONIC DEVICE

(71) Applicants: K-Tronics (Suzhou) Technology Co., Ltd., Jiangsu (CN); BOE Technology Group Co., Ltd., Beijing (CN)

(72) Inventors: Zhaoxi Yu, Beijing (CN); Wei Huang, Beijing (CN)

(73) Assignees: K-TRONICS (SUZHOU) TECHNOLOGY CO., LTD., Jiangsu (CN); BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 16/960,659

(22) PCT Filed: Aug. 16, 2019

(86) PCT No.: PCT/CN2019/101122
§ 371 (c)(1),
(2) Date: Jul. 8, 2020

(87) PCT Pub. No.: WO2021/030972
PCT Pub. Date: Feb. 25, 2021

(65) Prior Publication Data
US 2021/0161315 A1 Jun. 3, 2021

(51) Int. Cl.
*A47G 1/16* (2006.01)
*F16M 11/06* (2006.01)
*F16M 13/02* (2006.01)

(52) U.S. Cl.
CPC .......... *A47G 1/1613* (2013.01); *A47G 1/166* (2013.01); *F16M 11/06* (2013.01); *F16M 13/02* (2013.01)

(58) Field of Classification Search
CPC ....... A47G 1/166; A47G 1/1613; F16M 11/06
(Continued)

(56) References Cited

U.S. PATENT DOCUMENTS 2,530,892 A * 11/1950 Mayo ................... A47G 1/1606
248/498
3,529,799 A * 9/1970 Schaefer .............. A47G 1/0655
248/496
(Continued)

FOREIGN PATENT DOCUMENTS

CN          1158032 C      7/2004
CN        201858498 U      6/2011
(Continued)

OTHER PUBLICATIONS

International search report of PCT application No. PCT/CN2019/101122 dated Apr. 28, 2020.

*Primary Examiner* — Bradley Duckworth
(74) *Attorney, Agent, or Firm* — Fay Sharpe LLP

(57) ABSTRACT

The wall-mounted structure includes a wall-mounted plate fixable on a wall and a connecting plate connectable to an electronic device. The wall-mounted plate includes a plate body and a limiting block on a top end surface of the plate body provided with a first sliding surface extending in an arc shape. The limiting block is provided with a first limiting surface connected to the first sliding surface. The connecting plate includes a limiting plate. The limiting plate is provided with at least a bottom end surface and two main surfaces connected to two sides of the bottom end surface. The bottom end surface is a second sliding surface extending in an arc shape. One of the main surfaces of the limiting plate is a second limiting surface connected to the second sliding surface. The second limiting surface extends from one end of the limiting plate to the other end of the limiting plate.

19 Claims, 13 Drawing Sheets

(58) Field of Classification Search
USPC .................................. 248/224.7, 479, 476
See application file for complete search history.

(56) References Cited

U.S. PATENT DOCUMENTS

| | | | | |
|---|---|---|---|---|
| 4,083,525 A * | 4/1978 | Rath | ................... | A47G 1/1613 248/224.8 |
| 4,591,125 A * | 5/1986 | Bellehumeur | ....... | A47G 1/1606 248/476 |
| 5,563,766 A * | 10/1996 | Long | ................... | H02B 1/04 248/224.7 |
| 6,719,260 B1 * | 4/2004 | Hart | .................. | A47G 1/168 248/466 |
| 6,769,660 B2 * | 8/2004 | DeLine | ............... | A47G 1/1606 248/476 |
| 8,342,472 B2 * | 1/2013 | Gaudron | ............ | A47G 1/18 248/476 |
| 9,279,538 B1 * | 3/2016 | Wening | ............... | A47G 1/1613 |
| 9,395,044 B2 * | 7/2016 | Cheng | ................. | F16M 13/022 |
| 9,974,399 B1 * | 5/2018 | Tanger | ............... | A47B 97/001 |
| 10,674,843 B2 * | 6/2020 | Kaffee | ............... | A47G 1/1613 |
| 10,835,060 B2 * | 11/2020 | Burton | ............... | A47G 1/1613 |
| 10,856,675 B2 * | 12/2020 | Voelker | ............. | A47G 1/205 |
| 2006/0186304 A1 * | 8/2006 | McGee | ............... | A47G 1/1606 248/476 |
| 2007/0186384 A1 * | 8/2007 | Broehl | ................ | A47G 1/1613 16/355 |
| 2012/0112022 A1 * | 5/2012 | Cheng | ................ | A47G 25/10 248/205.3 |
| 2014/0150313 A1 * | 6/2014 | Stevens | ............. | A47G 1/1606 40/747 |
| 2016/0331158 A1 * | 11/2016 | Leahy | ................. | A47G 1/1613 |
| 2018/0125269 A1 * | 5/2018 | Smeja | ................. | A47G 1/175 |
| 2019/0045948 A1 * | 2/2019 | Gale | .................. | A47G 1/166 |

FOREIGN PATENT DOCUMENTS

| | | |
|---|---|---|
| FR | 2950517 A | 4/2011 |
| WO | WO0134001 A1 | 5/2001 |

* cited by examiner

WALL-MOUNTED STRUCTURE AND ELECTRONIC DEVICE

CROSS REFERENCE TO RELATED APPLICATIONS

This application is a 371 of PCT Application No. PCT/CN2019/101122, filed on Aug. 16, 2019, the entire contents of which are incorporated herein by reference.

TECHNICAL FIELD

The present disclosure relates to the technical field of display, in particular to a wall-mounted structure and an electronic device.

BACKGROUND

In order to save space, an electronic device such as flat panel TV, electronic photo frame is usually fixed on a wall through a fixed connecting structure such as a bracket, a connecting rod.

SUMMARY

Embodiments of the present disclosure provide a wall-mounted structure and an electronic device.

In a first aspect, an embodiment of the present disclosure provides a wall-mounted structure, including: a wall-mounted plate fixable on a wall and a connecting plate connectable to an electronic device, wherein the wall-mounted plate includes a plate body and a limiting block on a top end surface of the plate body, wherein the top end surface of the plate body is provided with a first sliding surface extending in an arc shape, and the limiting block is provided with a first limiting surface connected to the first sliding surface;

the connecting plate includes a limiting plate provided with at least a bottom end surface and two main surfaces connected to two sides of the bottom end surface, wherein the bottom end surface is a second sliding surface extending in an arc shape, one of the main surfaces of the limiting plate is a second limiting surface connected to the second sliding surface, the second limiting surface extending from one end of the limiting plate to the other end of the limiting plate;

wherein the limiting plate is configured such that the second sliding surface is disposed on the first sliding surface, the second limiting surface is opposite to the first limiting surface, and the limiting plate is slidable under a limit effect of the limiting block to enable the connecting plate to be rotatable relative to the wall-mounted plate in a plane parallel to the plate body.

Optionally, the limiting block is in the shape of a plate, and the limiting block extends from one end to the other end of the first sliding surface.

Optionally, the plate body is provided with a first main surface, wherein the first limiting surface of the limiting block is relatively parallel to the first main surface.

Optionally, the first sliding surface is a circular-arc surface protruding from the plate body, or the first sliding surface is a circular-arc surface recessed in the plate body.

Optionally, the wall-mounted plate is an axisymmetric structure, and the first sliding surface is symmetrical relative to an axis of symmetry of the wall-mounted plate.

Optionally, the connecting plate is provided with an opening, the limiting plate is a portion of the connecting plate proximal to the opening, wherein an inner wall of the opening is the second sliding surface, and a portion of the main surface on the periphery of the opening is the second limiting surface; or, the opening is provided with an extending portion extending outward along the inner wall of the opening on the connecting plate, wherein the inner wall of the extending portion is the second sliding surface, and the main surface of the extending portion connected to the inner wall of the opening is the second limiting surface.

Optionally, the limiting block is further provided with a top surface connected to the first limiting surface, wherein the top surface is a circular-arc surface parallel to the first sliding surface, and the inner wall of the opening is a circular-arc surface matching the top surface.

Optionally, the connecting plate is further provided with a first limiting structure and a second limiting structure at two ends of the limiting plate, wherein the first limiting structure and the second limiting structure are configured to limit a rotation range of the connecting plate relative to the wall-mounted plate.

Optionally, in the case that the first sliding surface is a protruding circular-arc surface, a circular-arc of the first sliding surface corresponds to a central angle of 90 degrees, and a circular-arc of the second sliding surface corresponds to a central angle of 180 degrees;

or, in the case that the first sliding surface is a recessed circular-arc surface, a circular-arc of the first sliding surface corresponds to a central angle of 180 degrees, and a circular-arc of the second sliding surface corresponds to a central angle of 270 degrees.

Optionally, the first limiting surface and the second limiting surface are correspondingly provided with mutually engaged snap protrusions, and the snap protrusions extend in an arc shape along the first limiting surface and the second limiting surface, respectively.

Optionally, a reinforcing rib is provided on a side of at least one of the limiting block and the plate body.

Optionally, the wall-mounted plate further includes at least one of the following structures:

a reinforcing rib on a side of at least one of the limiting block and the plate body;

a trace hole in the plate body; and a wall-mounted hole in the plate body.

In a second aspect, an embodiment of the present disclosure provides a wall-mounted structure, including: a wall-mounted plate fixable on a wall and a connecting plate connectable to an electronic device, wherein the wall-mounted plate includes a plate body and a limiting block on a plate surface of the plate body, wherein the limiting block is provided with a first limiting surface and a first sliding surface extending in an arc shape, the first sliding surface being connected between the first limiting surface and the plate body;

the connecting plate includes a limiting plate provided with at least a bottom end surface and two main surfaces connected to two sides of the bottom end surface, wherein the bottom end surface is a second sliding surface extending in an arc shape, one of the main surfaces of the limiting plate is a second limiting surface connected to the second sliding surface, the second limiting surface extending from one end to the other end of the limiting plate; and wherein the limiting plate is configured such that the second sliding surface is disposed on the first sliding surface, the second limiting surface is opposite to the first limiting surface, and the limiting plate is slidable under a limit effect of the limiting block to enable the connecting plate to be rotatable relative to the wall-mounted plate in a plane parallel to the plate body.

Optionally, the first sliding surface is a protruding circular-arc surface, or the first sliding surface is a recessed circular-arc surface.

Optionally, the connecting plate is provided with an opening, the limiting plate is a portion of the connecting plate proximal to the opening, wherein an inner wall of the opening is the second sliding surface, and a portion of the main surface on the periphery of the opening is the second limiting surface; or, the opening is provided with an extending portion extending outward along the inner wall of the opening on the connecting plate, wherein the inner wall of the extending portion is the second sliding surface, and the main surface of the extending portion connected to the inner wall of the opening is the second limiting surface.

Optionally, in the case that the first sliding surface is a protruding circular-arc surface, a circular-arc of the first sliding surface corresponds to a central angle of 90 degrees, and a circular-arc of the second sliding surface corresponds to a central angle of 180 degrees;

or, in the case that the first sliding surface is a recessed circular-arc surface, a circular-arc of the first sliding surface corresponds to a central angle of 180 degrees, and a circular-arc of the second sliding surface corresponds to a central angle of 270 degrees.

Optionally, the wall-mounted plate further includes at least one of the following structures:

a reinforcing rib on a side of at least one of the limiting block and the plate body;

a trace hole in the plate body; and a wall-mounted hole in the plate body.

In a third aspect, an embodiment of the present disclosure provides a wall-mounted structure, including: a wall-mounted plate fixable on a wall and a connecting plate connectable to an electronic device, wherein the wall-mounted plate includes a plate body and a limiting block on a top end surface of the plate body, wherein the top end surface of the limiting block is provided with a third sliding surface extending in an arc shape, and the limiting block is further provided with a first limiting surface connected to the third sliding surface and the top end surface of the plate body;

the connecting plate includes a limiting plate and an arc-shaped slide rail provided with a fourth sliding surface, wherein the limiting plate is provided with a second limiting surface connected to the fourth sliding surface, the second limiting surface extending from one end to the other end of the limiting plate; and wherein the connecting plate is configured such that the fourth sliding surface is disposed on the third sliding surface, the second limiting surface is opposite to the first limiting surface, and the arc-shaped slide rail is slidable under a limit effect of the limiting block to enable the connecting plate to be rotatable relative to the wall-mounted plate in a plane parallel to the plate body.

In a fourth aspect, an embodiment of the present disclosure provides a wall-mounted structure, including: a wall-mounted plate fixable on a wall and a connecting plate connectable to an electronic device, wherein the wall-mounted plate includes a plate body and a limiting block on a plate surface of the plate body, wherein a top end surface of the limiting block is provided with a third sliding surface extending in an arc shape, and the limiting block is further provided with a first limiting surface connected to the third sliding surface, the first limiting surface being opposite to the plate surface of the plate body;

the connecting plate includes a limiting plate and an arc-shaped slide rail provided with a fourth sliding surface, wherein the limiting plate is provided with a second limiting surface connected to the fourth sliding surface, the second limiting surface extending from one end to the other end of the limiting plate;

wherein the connecting plate is configured such that the fourth sliding surface is disposed on the third sliding surface, the second limiting surface is opposite to the first limiting surface, and the arc-shaped slide rail is slidable under a limit effect of the limiting block to enable the connecting plate to be rotatable relative to the wall-mounted plate in a plane parallel to the plate body.

According to a fifth aspect, an embodiment of the present disclosure provides an electronic device, including a wall-mounted structure described in the foregoing first aspect, second aspect, third aspect, or fourth aspect.

DETAILED DESCRIPTION

In order to make the principles, technical solutions and advantages of the present disclosure clearer, the embodiments of the present disclosure will be described in further detail below with reference to the accompanying drawings.

In the related art, an electronic device is fixed on a wall through a fixed connecting structure such as a bracket, a connecting rod. In the case that a user needs to change display state of the electronic device, for example, from horizontal display to vertical display, the user needs to remove the electronic device from the fixed connecting structure or remove the fixed connecting structure from the wall, and then reinstall same, which is very inconvenient.

Figure 1:
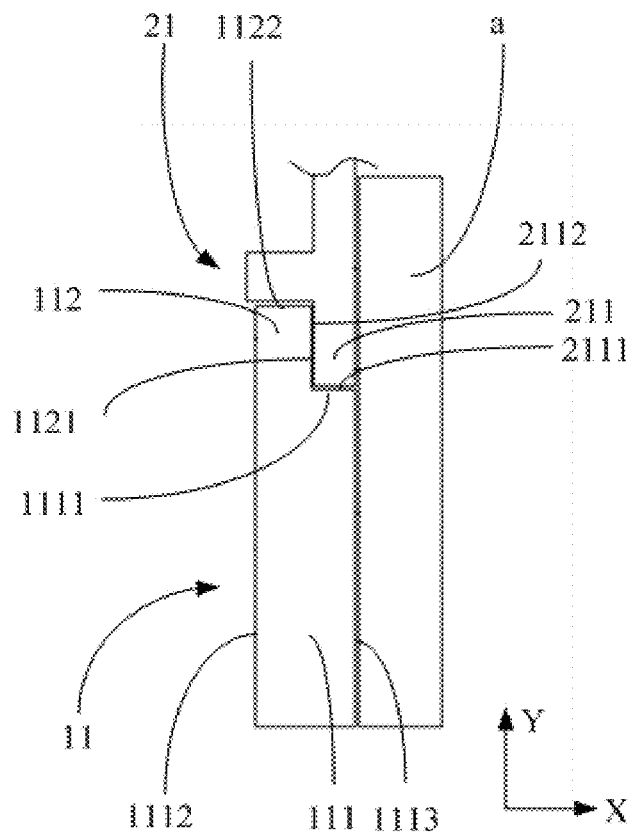
FIG. 1 is a structural cross-sectional view of a wall-mounted structure according to an embodiment of the present disclosure.

FIG. 1 is a structural cross-sectional view of a wall-mounted structure according to an embodiment of the present disclosure. As shown in FIG. 1, the wall-mounted structure includes a wall-mounted plate 11 and a connecting plate 21. The wall-mounted plate 11 is used to be fixed on a wall a. The connecting plate 12 is used to connect with an electronic device (not shown).

Figure 2:
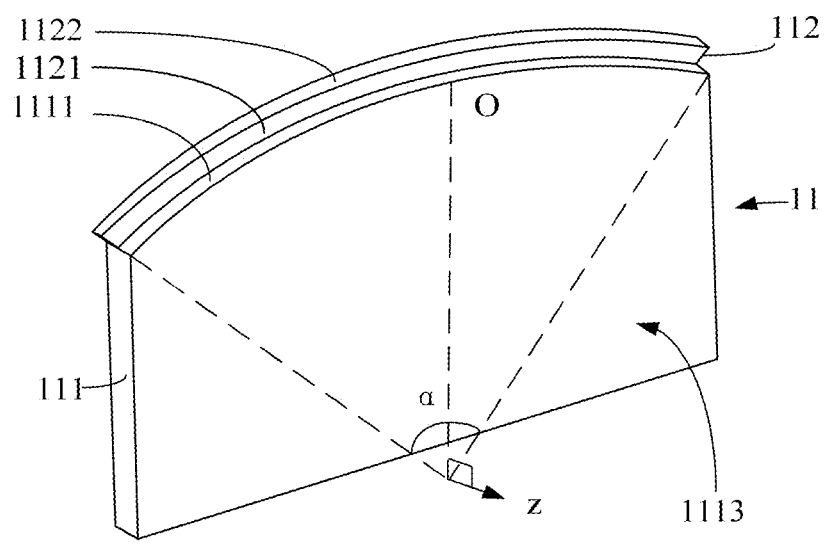
FIG. 2 is a partial structural diagram of a wall-mounted plate according to an embodiment of the present disclosure.

FIG. 2 is a partial structural diagram of a wall-mounted plate according to an embodiment of the present disclosure. As shown in FIG. 2, the wall-mounted plate 11 includes a plate body 111 and a limiting block 112 on a top end surface of the plate body 111. The top end surface of the plate body 111 is provided with a first sliding surface 1111 extending in an arc shape. The limiting block 112 is provided with a first limiting surface 1121 connected to the first sliding surface 1111.

Figure 3:
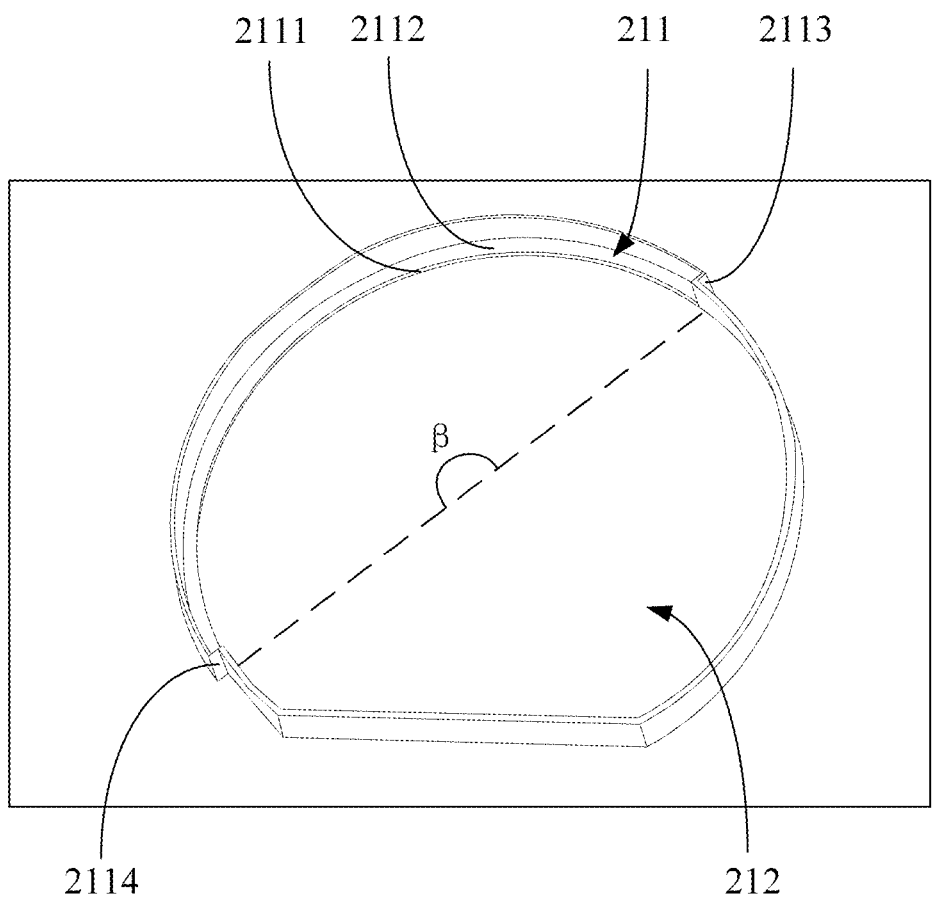
FIG. 3 is a partial structural diagram of a connecting plate according to an embodiment of the present disclosure.

FIG. 3 is a partial structural diagram of a connecting plate according to an embodiment of the present disclosure. As shown in FIG. 3, the connecting plate 21 includes a limiting plate 211. The limiting plate 211 is provided with at least a bottom end surface and two main surfaces connected to two sides of the bottom end surface. The bottom end surface is a second sliding surface 2111 extending in an arc shape. One of the main surfaces of the limiting plate 211 is a second limiting surface 2112 connected to the second sliding surface 2111. The second limiting surface 2112 extends from one end of the limiting plate 211 to the other end of the limiting plate 211.

Referring to FIG. 1 to FIG. 3, the limiting plate 211 is configured such that the second sliding surface 2111 is disposed on the first sliding surface 1111, the second limiting surface 2112 is opposite to the first limiting surface 1121, and the limiting plate 211 is slidable under a limit effect of the limiting block 112, such that the connecting plate 21 is rotatable relative to the wall-mounted plate 11 in a plane parallel to the plate body 111.

The plate body of the wall-mounted plate is connected to the wall. The top end surface of the plate body is an end surface which connects two plate surfaces of the plate body and is oriented upwards when in use. In the case that the connecting plate and the wall-mounted plate are cooperatively connected, the first limiting surface of the limiting block can block and limit the limiting plate in a direction opposite to the second limiting surface of the limiting plate to prevent the connecting plate from falling off from the wall-mounted plate when the wall-mounted structure is in a display state. At the same time, the limiting plate and the plate body may slide relatively by slidably connecting the first sliding surface on the plate body of the wall-mounted plate to the second sliding surface on the limiting plate of the connecting plate, such that the connecting plate may rotate relative to the wall-mounted plate in a plane parallel to the body plate to realize the rotation of the electronic device connected to the connecting plate. The user can conveniently change the display state of the electronic device fixed on the wall by the wall-mounted structure according to actual needs by rotating the wall-mounted structure, such as from horizontal display to vertical display.

Referring to FIGS. 1 and 2, in the embodiment of the present disclosure, the plate body 111 includes a first main surface 1112 and a second main surface 1113 opposite to each other, and four end surfaces connecting the first main surface 1112 to the second main surface 1113. An end surface disposed upward when in use may be referred to as a top end surface. One side of the top end surface is provided with the limiting block 112. The other area of the top end surface except the limiting block 112 is the first sliding surface 1111. Of the remaining three end surfaces, the left and right end surfaces are arranged relatively parallel, and the remaining one is perpendicular to the left and right end surfaces.

Exemplarily, an angle between a tangent plane at any point of the first sliding surface 1111 and the plate surface of the wall-mounted plate is 90 degrees. That is, a center line z of the circular-arc where the first sliding surface 1111 is located is perpendicular to the plate surface of the wall-mounted plate.

Exemplarily, in the embodiment of the present disclosure, the wall-mounted plate 11 may be an integrally formed structure. For example, the wall-mounted plate 11 may be manufactured by an injection stamping process.

Optionally, the first limiting surface 1121 of the limiting block 112 is relatively parallel to the first main surface 1112. In the case that the first main surface 1112 is relatively perpendicular to the first sliding surface 1111, the first limiting surface 1121 is also relatively perpendicular to the first sliding surface 1111. In other possible implementations, the first limiting surface 1121 may also be set at an angle to the first main surface 1112. That is, the first limiting surface 1221 may also be set at an angle to the first sliding surface 1111, as long as the connecting plate 21 can be limited in a direction opposite to the second limiting surface 2112 to prevent the connecting plate 21 from falling off from the wall-mounted plate 11 when the wall-mounted structure is in a display state, which is not limited in the present disclosure.

Optionally, the connecting plate 21 is provided with an opening 212. The limiting plate 211 is a portion of the connecting plate 21 proximal to the opening 212. An inner wall of the opening 212 is the second sliding surface 2111. A portion of the main surface on the periphery of the opening is the second limiting surface 2112. Or, the opening 212 is provided with an extending portion extending outward along the inner wall of the opening 212 on the connecting plate 21. The inner wall of the extending portion is the second sliding surface 2111. The main surface of the extending portion connected to the inner wall of the opening 212 is the second limiting surface 2112. The plate body 111 cooperatively connected to the limiting plate 211 can be entirely arranged in the opening 212 by disposing the limiting plate 211 at the opening 212, which reduces the overall thickness of the wall-mounted structure in a direction perpendicular to the plate body 111, reduces the amount of material used in the wall-mounted structure, and thus reduces costs.

Exemplarily, in the embodiment of the present disclosure, the opening 212 is a closed opening. In other embodiments, the opening 212 may also be a non-closed opening, for example, extending to a side of the connecting plate 21. In addition, the opening 212 is approximately in a circular shape. In other embodiments, the shape of the opening may also be set according to actual needs, for example, according to the shape and size of the wall-mounted plate, as long as it does not affect the relative movement of the connecting plate and the wall-mounted plate.

Optionally, referring to FIG. 1, FIG. 2, and FIG. 3, the limiting block 112 is further provided with a top surface 1122 connected to the first limiting surface 1121. The top surface 1122 is a circular-arc surface parallel to the first sliding surface 1111. The inner wall of the opening 212 is a circular-arc surface matching the top surface 1122. The inner wall of the opening 212 can be regarded as a slide rail. The top surface 1122 of the limiting block 112 is slidable in the slide rail formed by the inner wall of the opening 212. In this case, the top surface 1122 is in contact with the inner wall of the opening 212. Relative to the first sliding surface 1111 and the second sliding surface 2111 that are in sliding fit, the top surface 1122 can support the inner wall of the opening 212, thereby improving the stability of the wall-mounted structure when adjusting the mounting state.

Figure 4:
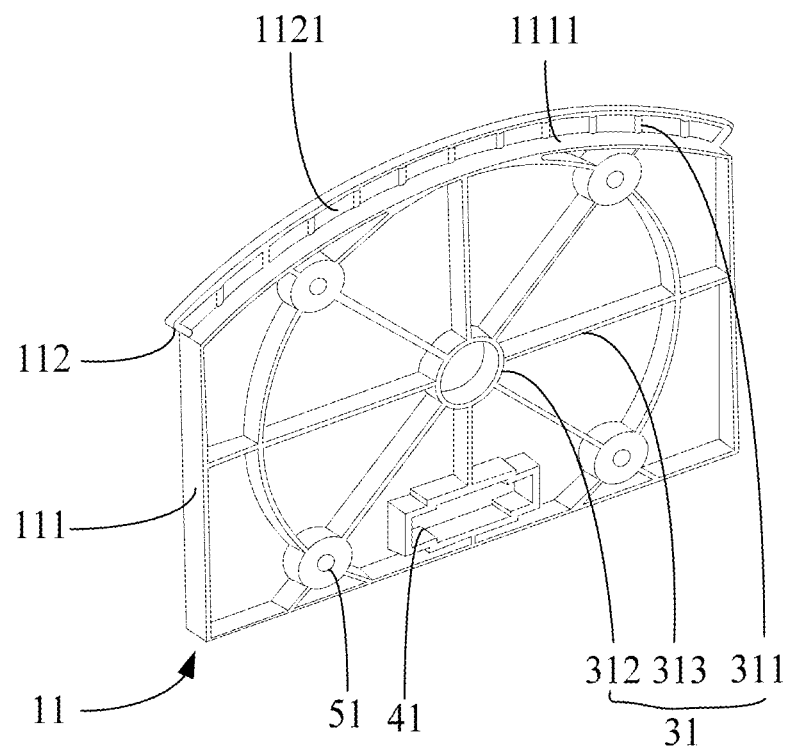
FIG. 4 is a three-dimensional structural diagram of a wall-mounted plate according to an embodiment of the present disclosure.

FIG. 4 is a three-dimensional structural diagram of a wall-mounted plate according to an embodiment of the present disclosure. As shown in FIG. 4, exemplarily, the limiting block 112 is in the shape of a plate. The limiting block 112 extends from one end of the first sliding surface 1111 to the other end of the first sliding surface 1111. The limiting block 112 is in the shape of a plate. That is, the limiting block 112 is provided with two main surfaces connected to the top end surface. The main surface opposite to the second limiting surface 2112 is the first limiting surface 1121. The first limiting surface 1121 extends along the longitudinal direction of the first sliding surface 1111. The first limiting surface 1121 of the plate-shaped limiting block 112 can better limit the limiting plate 211 in a direction opposite to the second limiting surface 2112 of the limiting plate 211 (that is, in a direction perpendicular to the plate surface of the plate body 111) to prevent the connecting plate 21 from falling off from the wall-mounted plate in a direction perpendicular to the plate body 111 when the wall-mounted structure is in a display state. At the same time, the plate-shaped limiting block has better load-bearing effect.

It should be noted that, in order to enable the connecting plate 21 to rotate relative to the wall-mounted plate 11 in a plane parallel to the plate body 111, the limiting block 112 is on a side of the first sliding surface 1111 in a direction perpendicular to the longitudinal direction of the first sliding surface 1111. In other embodiments, the limiting block may not be plate-shaped but block-shaped. For example, a plurality of block-shaped limiting blocks may be arranged at intervals along the longitudinal direction of the first sliding surface 1111.

Figure 5:
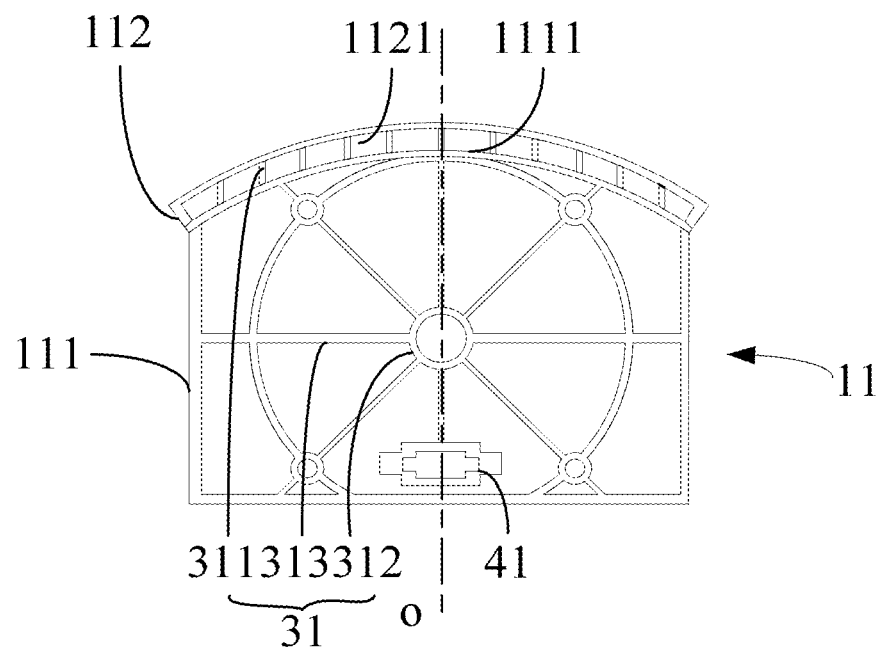
FIG. 5 is a front structural diagram of a wall-mounted plate according to an embodiment of the present disclosure.

FIG. 5 is a front structural diagram of a wall-mounted plate according to an embodiment of the present disclosure. As shown in FIG. 5, the wall-mounted plate 11 is an axisymmetric structure. The first sliding surface 1111 is symmetrical relative to an axis of symmetry o of the wall-mounted plate 11. The wall-mounted plate 11 with an axisymmetric structure is easy to observe whether it is installed in place during installation, and is convenient to use and beautiful in appearance.

Optionally, a side of at least one of the limiting block 112 and the plate body 111 is provided with a reinforcing rib 31. In the case that an electronic device connected to the connecting plate 21 is heavy, the wall-mounted plate 11 on which the connecting plate 21 is mounted may have a problem of being crushed by the connecting plate 21 if the rigidity is insufficient. By providing the reinforcing rib 31 on the wall-mounted plate 11, the rigidity of the wall-mounted plate 11 can be increased, thereby increasing the weight of the electronic device that the wall-mounted structure can bear, and improving the versatility of the wall-mounted structure.

Exemplarily, the first limiting surface 1121 is provided with a plurality of strip-shaped reinforcing ribs 311. The plurality of strip-shaped reinforcing ribs 311 is evenly spaced along the longitudinal direction of the first limiting surface 1121. The evenly spaced reinforcing ribs 31 more evenly bear the pressure bearing on the limiting block 112. The rigidity of the first limiting surface 1121 is further increased by disposing the plurality of reinforcing ribs 31 on a side of the limiting block 112 opposite to the limiting plate 211.

Optionally, the reinforcing ribs 31 on the plate body 111 include an annular reinforcing rib 312 and an asterisk-shaped reinforcing rib 313. The centers of the asterisk-shaped reinforcing rib 313 and the annular reinforcing rib 312 coincide. The rigidity of the plate body 111 is improved and thus the rigidity of the whole wall-mounted plate 11 is improved by providing the ring-shaped reinforcing rib 312 and the asterisk-shaped reinforcing rib 313 on the plate body 111.

It should be noted that, in the embodiment of the present disclosure, the form of the reinforcing rib 31 provided on the plate body 111 is only an example. The use of the annular reinforcing rib 312 and the asterisk-shaped reinforcing rib 313 is a design such that the reinforcing rib 31 can cover structure of the entire plate body 111 as much as possible to improve the overall rigidity of the plate body 111 based on the consideration of material cost and processing difficulty. In other possible implementations, in order to further achieve the effect of improving the rigidity of the wall-mounted plate 11, a denser distribution pattern of reinforcing ribs 31 may also be adopted, which is not limited in the present disclosure.

Optionally, the wall-mounted plate 11 is provided with at least one of a trace hole 41 and a wall-mounted hole 51. The trace hole 41 is convenient for traces such as cables of electronic devices. The wall-mounted hole 51 is convenient for fixing the wall-mounted plate. Corresponding trace holes 41 and wall-mounted holes 51 can be arranged in the wall-mounted plate 11 according to the user's needs and the form of the electronic device connected to the connecting plate 21 to further improve the versatility of the wall-mounted structure.

Exemplarily, the trace hole 41 may be a cross-shaped structure disposed proximal to the bottom of the wall-mounted plate. The wall-mounted hole 51 is a through hole. A reinforcement structure may be provided around the wall-mounted hole 51. For example, a cylindrical protrusion coaxial with the wall-mounted hole 51 is provided on the plate surface of the wall-mounted plate to improve the load-bearing capacity of the wall-mounted plate.

Figure 6:
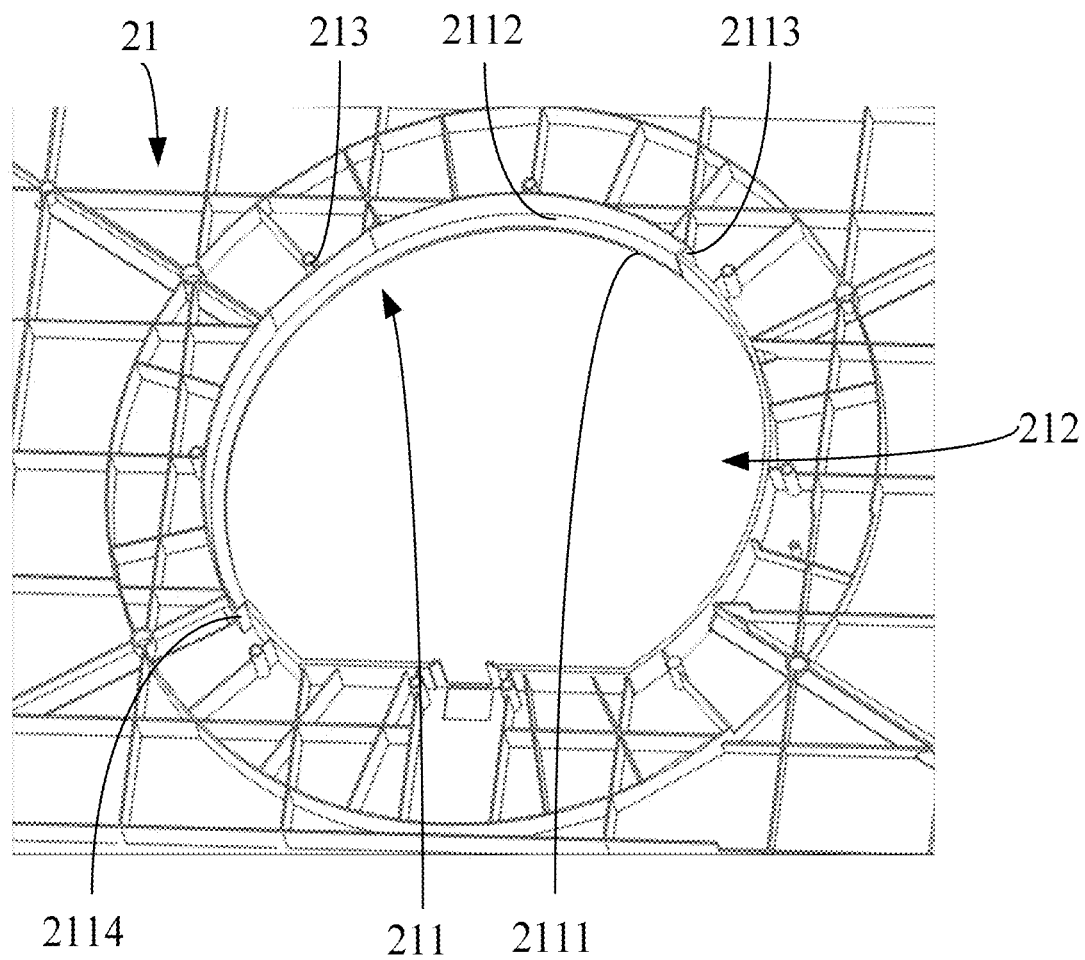
FIG. 6 is a three-dimensional structural diagram of a connecting plate according to an embodiment of the present disclosure.

FIG. 6 is a three-dimensional structural diagram of a connecting plate according to an embodiment of the present disclosure. As shown in FIG. 6, the connecting plate 21 is provided with an electronic device connecting structure 213. For example, the connecting plate 21 may be connected to a rear case of the electronic device as an additional component. In this case, the electronic device connecting structure 213 may be a connecting hole. By providing a plurality of connecting holes and connecting to the rear case of the electronic device through fasteners such as bolts, the versatility of the wall-mounted structure is increased. As another example, the connecting plate 21 may be used as the rear case of the electronic device to encapsulate the electronic device. In this case, the electronic device connecting structure may include at least one of a bayonet and a connecting hole.

Optionally, in order to improve the strength of the connecting plate, the connecting plate 21 may also be provided with reinforcing ribs.

Figure 7:
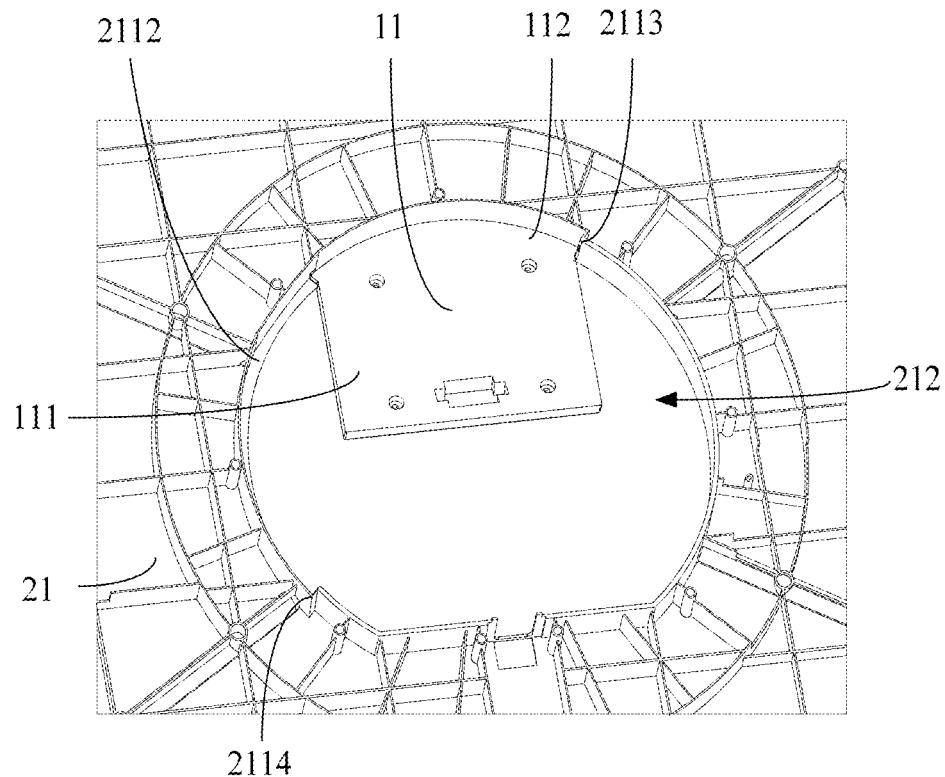
FIG. 7 is a three-dimensional structural diagram of a wall-mounted structure according to an embodiment of the present disclosure.

FIG. 7 is a three-dimensional structural diagram of a wall-mounted structure according to an embodiment of the present disclosure. As shown in FIGS. 6 and 7, the connecting plate 21 is further provided with a first limiting structure 2113 and a second limiting structure 2114 at two ends of the limiting plate 211. The first limiting structure 2113 and the second limiting structure 2114 are configured to limit a rotation range of the connecting plate 21 relative to the wall-mounted plate 11. That is, by providing the first limiting structure 2113 and the second limiting structure 2114 at two ends of the limiting plate 211, the stroke of the connecting plate 21 rotating relative to the wall-mounted plate 11 can be limited. After the limiting block 112 contacts the first limiting structure 2113 or the second limiting structure 2114, the connecting plate 21 no longer rotates relative to the wall-mounted plate 11, reaching the display state required by the user.

Figure 8:
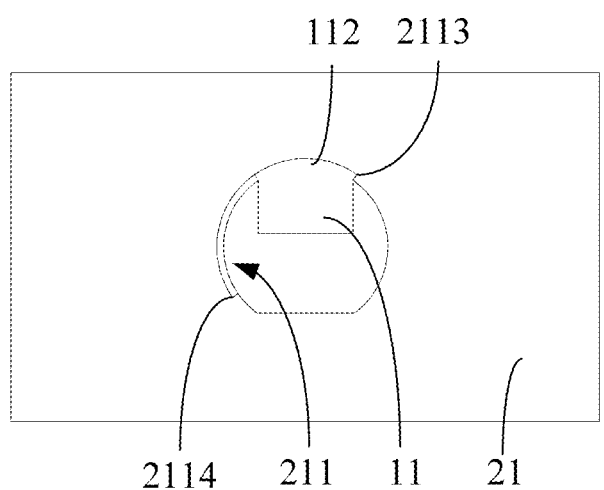
FIG. 8 is an overall structural diagram of a limiting block contacting a first limiting structure according to an embodiment of the present disclosure.
Figure 9:
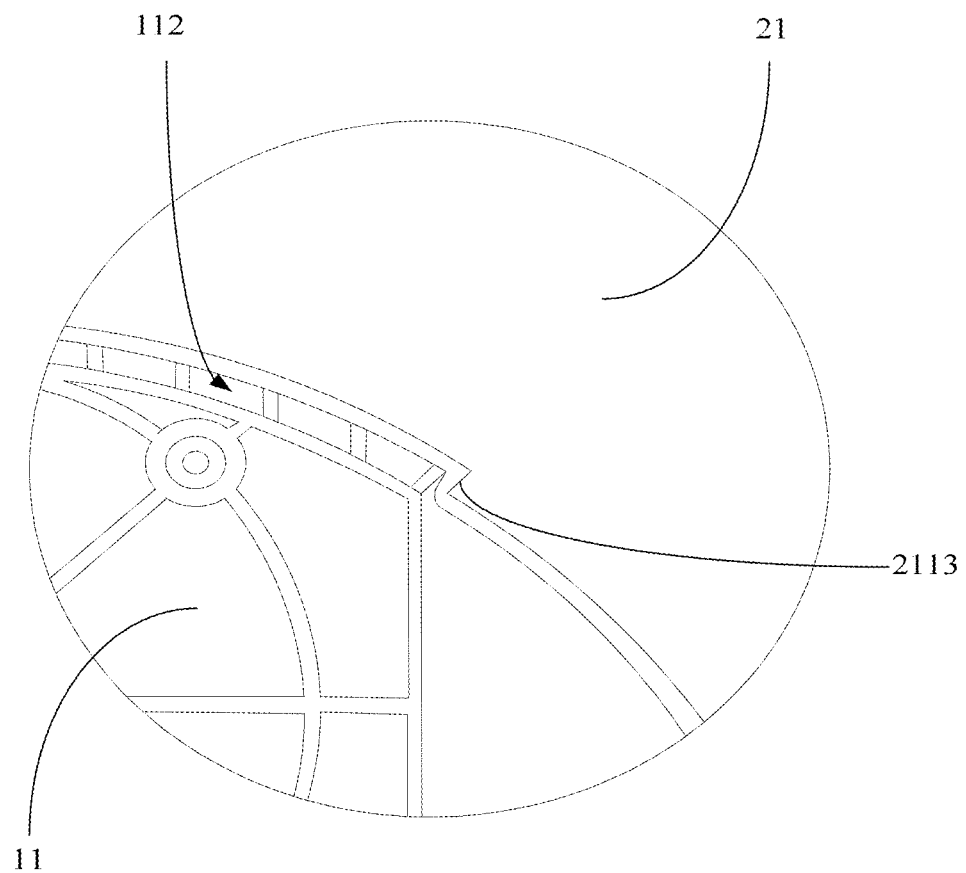
FIG. 9 is a partial structural diagram of a limiting block contacting a first limiting structure according to an embodiment of the present disclosure.
Figure 10:
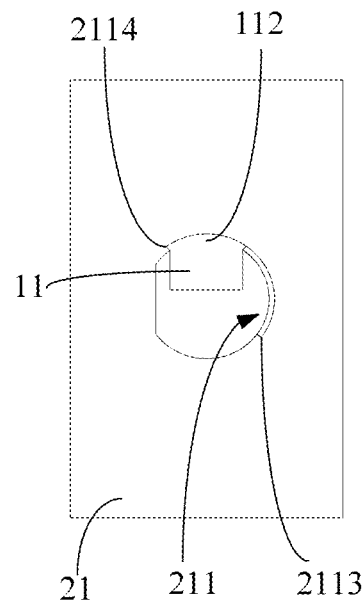
FIG. 10 is an overall structural diagram of a limiting block contacting a second limiting structure according to an embodiment of the present disclosure.
Figure 11:
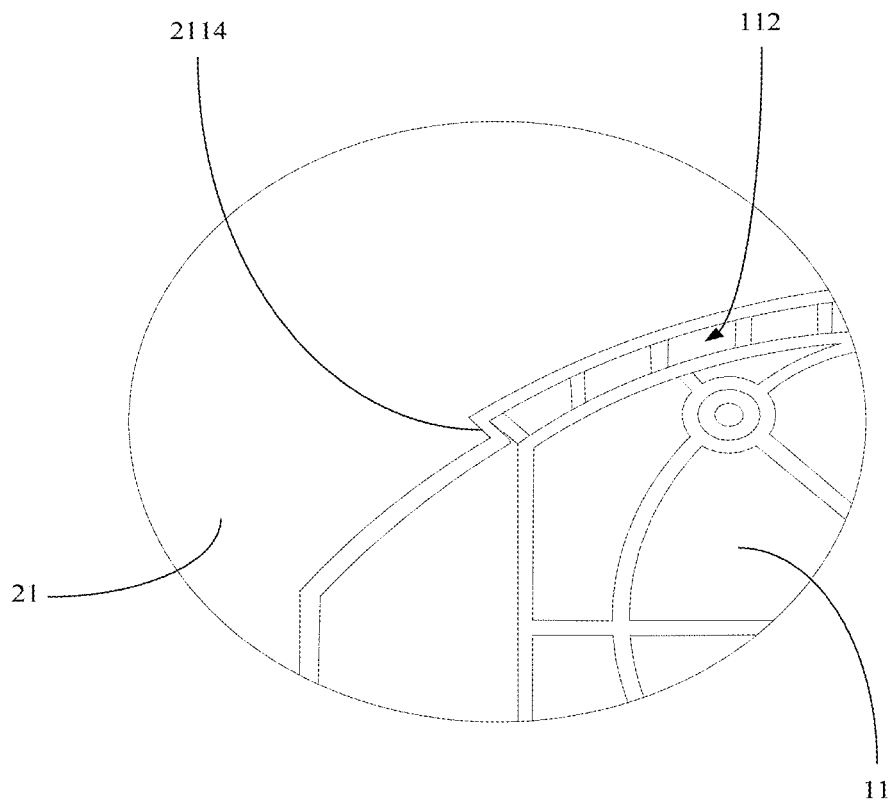
FIG. 11 is a partial structural diagram of a limiting block contacting a second limiting structure according to an embodiment of the present disclosure.

Optionally, referring again to FIGS. 2 and 3, a circular-arc of the first sliding surface 1111 corresponds to a central angle α of 90 degrees. The first sliding surface 1111 is equivalent to a quarter circular-arc surface. A circular-arc of the second sliding surface 2111 corresponds to a central angle β of 180 degrees. The second sliding surface 2111 is equivalent to a half circular-arc surface. In this case, the first limiting structure 2113 is a baffle at one end of the circular-arc of the second sliding surface 2111 for abutting one end of the circular-arc of the first sliding surface 1111 on the limiting block 112. The second limiting structure 2114 is a baffle at the other end of the circular-arc of the second sliding surface 2111 for abutting the other end of the circular-arc of the second sliding surface 2111 on the limiting block 112. FIG. 8 is an overall structural diagram of a limiting block contacting a first limiting structure according to an embodiment of the present disclosure. FIG. 9 is a partial structural diagram of a limiting block contacting a first limiting structure according to an embodiment of the present disclosure. As shown in FIGS. 8 and 9, the limiting block 112 contacts the first limiting structure 2113. That is, one end of the limiting block 112 abuts one end of the limiting plate 211. In this case, the connecting plate 21 is in a first display state, such as a horizontal display state. FIG. 10 is an overall structural diagram of a limiting block contacting a second limiting structure according to an embodiment of the present disclosure. FIG. 11 is a partial structural diagram of a limiting block contacting a second limiting structure according to an embodiment of the present disclosure. As shown in FIGS. 10 and 11, the limiting block 12 contacts the second limiting structure 2114. That is, the other end of the limiting block 112 abuts the other end of the limiting plate 211. In this case, the connecting plate 21 is in a second display state, such as a vertical display state. With reference to FIGS. 9 to 11, in this embodiment, the wall-mounted structure is designed such that in the case that the limiting block 12 slides from a state of abutting the first limiting structure 2113 to a state of abutting the second limiting structure 2114, the connecting plate 21 rotates by 90 degrees relative to the wall-mounted plate 11 to enable the electronic device connected to the connecting plate 21 to rotate correspondingly by 90 degrees, thereby enabling the electronic device to change from a horizontal display state to a vertical display state.

It should be noted that the rotatable angle of the connecting plate 21 relative to the wall-mounted plate 1 according to the embodiment of the present disclosure is only an example. According to different needs of users, by changing the circular-arc length of the limiting plate 211, in the case that the limiting block 12 slides from the first limiting structure 2113 to the second limiting structure 2114, the rotation angle of the connecting plate 21 relative to the wall plate 11 may also be 60 degrees, 45 degrees or the like, which is not limited in the present disclosure.

Figure 12:
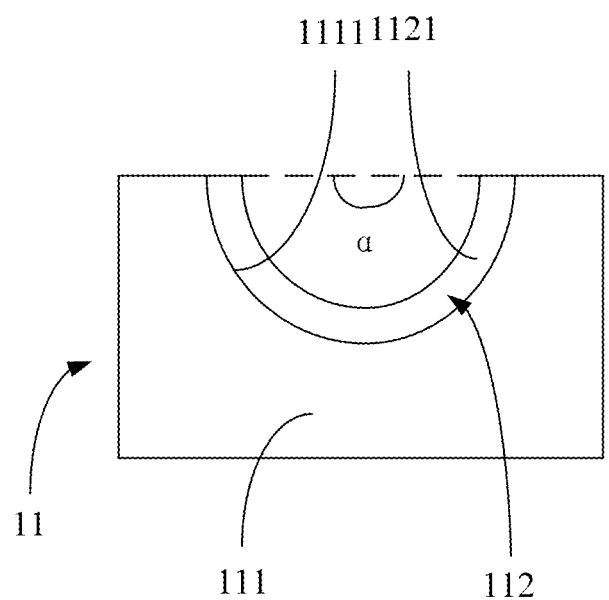
FIG. 12 is a front structural diagram of another wall-mounted plate according to an embodiment of the present disclosure.
Figure 13:
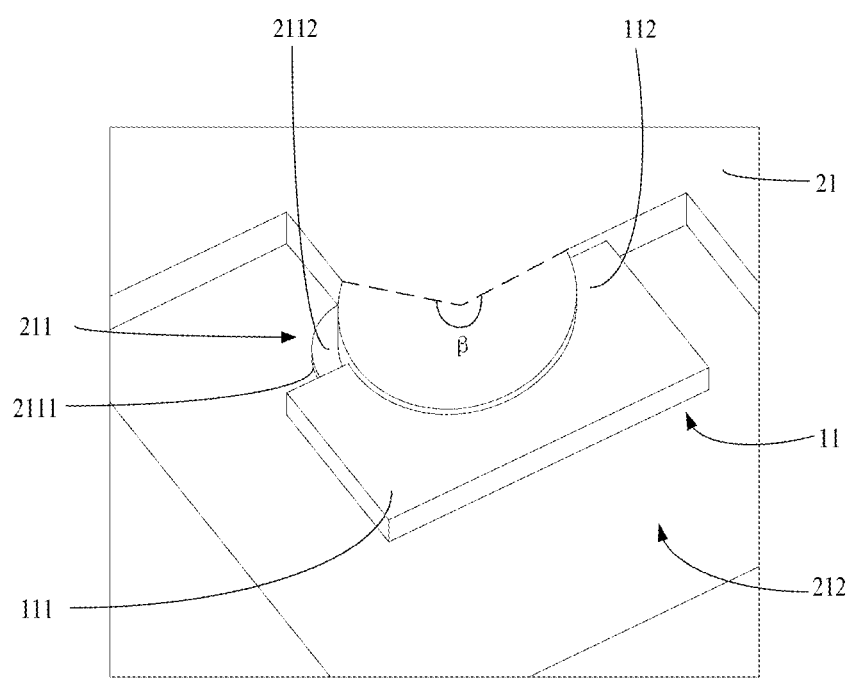
FIG. 13 is a structural diagram of another wall-mounted structure according to an embodiment of the present disclosure.

FIG. 12 is a front structural diagram of another wall-mounted plate according to an embodiment of the present disclosure. As shown in FIG. 12, in other possible implementations, the first sliding surface 1111 may also be a circular-arc surface recessed at the top of the plate body 111. FIG. 13 is a structural diagram of another wall-mounted structure according to an embodiment of the present disclosure. As shown in FIG. 13, correspondingly, the second sliding surface 2111 of the limiting plate 211 on the connecting plate 21 is a protruding circular-arc surface corresponding to the first sliding surface 1111, as long as the sliding cooperation between the first sliding surface 1111 and the second sliding surface 2111 can be achieved, which is not limited in the present disclosure. Exemplarily, as shown in FIGS. 12 and 13, in the case that the first sliding surface 1111 is a recessed circular-arc surface, a circular-arc of the first sliding surface 1111 corresponds to a central angle α of 180 degrees. The first sliding surface 1111 is equivalent to a half circular-arc surface. A circular-arc of the second sliding surface 2111 corresponds to a central angle β of 270 degrees. The second sliding surface 2111 is equivalent to a three-quarter circular-arc surface.

Figure 14:
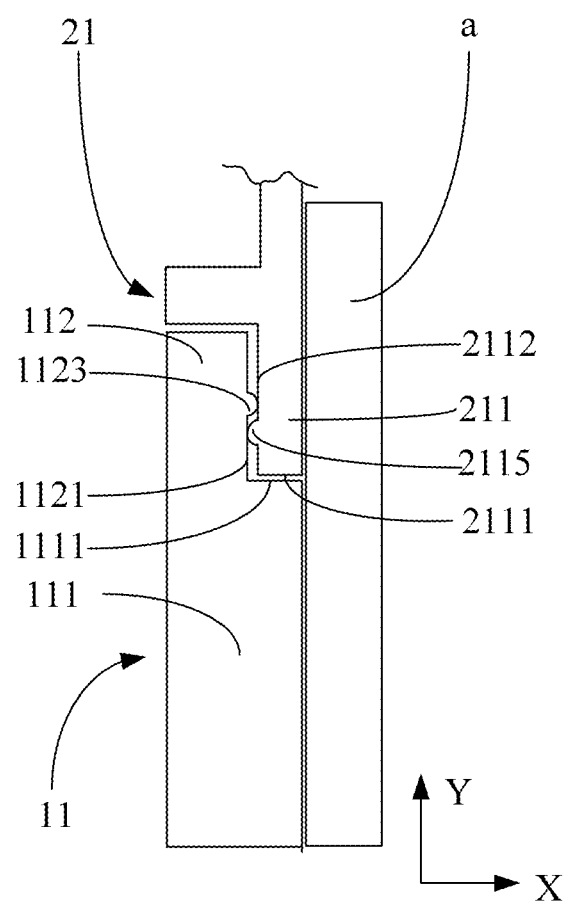
FIG. 14 is a structural cross-sectional view of a wall-mounted structure with a snap protrusion according to an embodiment of the present disclosure.

FIG. 14 is a structural cross-sectional view of a wall-mounted structure with a snap protrusion according to an embodiment of the present disclosure. As shown in FIG. 14, the first limiting surface 1121 and the second limiting surface 2112 are correspondingly provided with mutually engaged snap protrusions. The first limiting surface 1121 of the limiting block 112 may be provided with a first snap protrusion 1123. Correspondingly, the second limiting surface 2112 of the limiting plate 211 may be provided with a second snap protrusion 2115. In the case that the first sliding surface 1111 and the second sliding surface 2111 are cooperatively connected, a distance between the first snap protrusion 1123 and the first sliding surface 1111 is greater than a distance between the second snap protrusion 2115 and the first sliding surface 1111. The snap protrusion 1123 can limit the second snap protrusion 2115 in a direction parallel to the plate body 111 to prevent the limiting plate 211 from falling off in a space formed by the limiting block 112 and the wall surface a from a direction parallel to the plate body 111 when the wall-mounted structure is in a display state, causing the connecting plate 21 to fall off from the wall-mounted plate 11.

Exemplarily, the first snap protrusion 1123 and the second snap protrusion 2115 may be a strip structure, a block-shaped structure or a prismatic structure extending in an arc shape, as long as they can be snapped to each other to prevent the connecting plate 21 from falling off from the wall-mounted plate 11 in a direction parallel to the plate body 111 and does not affect the relative rotation of the connecting plate 21 and the wall-mounted plate 11, which is not limited in the present disclosure.

Optionally, the wall-mounted plate 11 is a plastic part or a metal part. The plastic part has insulation, light weight, and low material cost. The metal part has high strength and is not easily deformed. The wall-mounted plate 11 is fabricated by a corresponding material according to the electronic device actually connected to the wall-mounted structure, as long as the connecting plate 21 connecting the electronic device is rotatable relative to the wall-mounted plate 11 to achieve the display state required by the user, which is not limited in the present disclosure.

Figure 15:
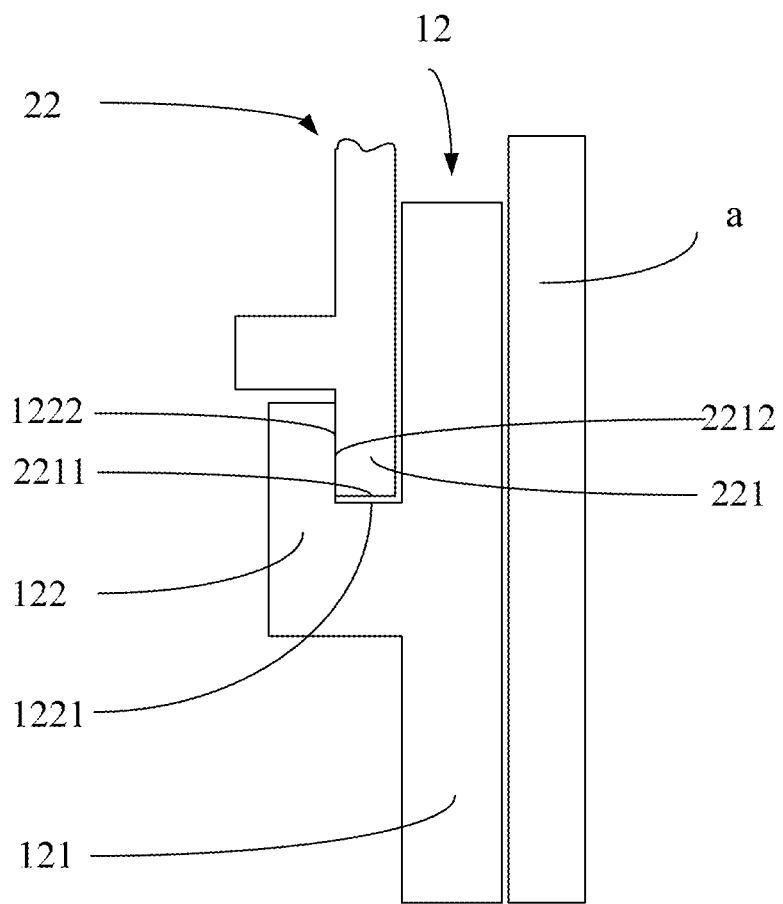
FIG. 15 is a cross-sectional view of another wall-mounted structure according to an embodiment of the present disclosure.

FIG. 15 is a cross-sectional view of another wall-mounted structure according to an embodiment of the present disclosure. As shown in FIG. 15, another wall-mounted structure is provided according to an embodiment of the present disclosure, including: a wall-mounted plate 12 and a connecting plate 22. The wall-mounted plate 12 includes a plate body 121 and a limiting block 122 on a plate surface of the plate body 121. The limiting block 122 is provided with a first limiting surface 1222 and a first sliding surface 1221 extending in an arc shape. The first sliding surface 1221 is connected between the first limiting surface 1222 and the plate surface of the plate body 121.

The connecting plate 22 includes a limiting plate 221. The limiting plate 221 is provided with at least a bottom end surface and two main surfaces connected to two sides of the bottom end surface. The bottom end surface is a second sliding surface 2211 extending in an arc shape. One of the main surfaces of the limiting block 221 is a second limiting surface 2212 connected to the second sliding surface 2211. The second limiting surface 2212 extends from one end of the limiting plate 221 to the other end of the limiting plate 221.

The limiting plate 221 is configured to be disposed on the first sliding surface 1221 and is slidable under a limit effect of the limiting block 122, such that the connecting plate 22 is rotatable relative to the wall-mounted plate 12 in a plane parallel to the plate body 121.

The plate body 121 is fixed on the wall. The limiting block 122 is on a plate surface of the plate body 121. The first limiting surface 1222 and the first sliding surface 1221 of the limiting block 122 and the plate surface of the plate body 121 form a U-shaped limiting groove. Opening of the limiting groove is oriented upward. The first sliding surface 1221 can be regarded as the bottom of the limiting groove. In the case that the limiting plate 221 of the connecting plate 22 is disposed in the limiting groove, the first limiting surface 1222 of the limiting block 122 can block and limit the limiting plate 221 in a direction opposite to the second limiting surface 2212 of the limiting plate 221 to prevent the connecting plate 22 from falling off from the wall-mounted plate 12 when the wall-mounted structure is in a display state. By slidably connecting the first sliding surface 1221 in the limiting groove to the second sliding surface 2211 on the limiting plate 221, the limiting plate 221 and the limiting groove are slidable relatively, such that the connecting plate 22 is rotatable relative to the wall-mounted plate 12 in a plane parallel to the wall-mounted plate 12, such that the display state of the electronic device connected to the connecting plate 22 can be changed.

At the same time, by disposing the limiting block 122 on a plate surface of the plate body 121, the plate body 121 can be used as a partition plate attached between the wall a and the connecting plate 22, which prevents the connecting plate 22 from friction with the wall during rotation to cause wear, which increases the service life of the wall-mounted structure.

Exemplarily, a side wall where the first limiting surface 1222 is located may be perpendicular to the first sliding surface 1221. In other possible implementations, the side wall where the first limiting surface 1222 is located may also be disposed at an angle to the first sliding surface 1221, as long as the connecting plate 22 can be limited in a direction opposite to the second limiting surface 2212 to prevent the connecting plate 22 from falling off from the wall-mounted plate 12 when the wall-mounted structure is in a display state, which is not limited in the present disclosure.

Optionally, the first sliding surface 1221 is a protruding circular-arc surface. In other possible implementations, the first sliding surface 1221 may also be a recessed circular-arc surface, as long as the sliding cooperation between the first sliding surface 1221 and the second sliding surface 2211 can be achieved, which is not limited in the present disclosure. In this embodiment, the first sliding surface 1221 being a recessed circular-arc surface is taken for exemplary description. For the structure of the first sliding surface 1221, reference may be made to relevant description of the structure of the first sliding surface 1111 in the first type of wall-mounted structure in FIGS. 12 and 13.

Figure 16:
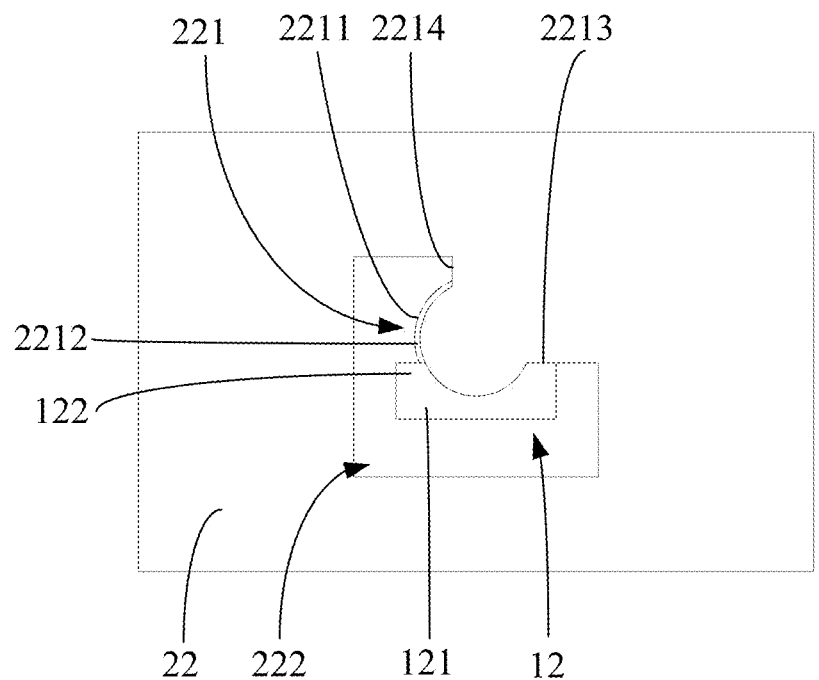
FIG. 16 is a structural diagram of another limiting block contacting a limiting structure according to an embodiment of the present disclosure.

FIG. 16 is a structural diagram of another limiting block contacting a limiting structure according to an embodiment of the present disclosure. As shown in FIG. 16, the connecting plate 22 is provided with an opening 222. The limiting plate 221 is a portion of the connecting plate 22 proximal to the opening 222. An inner wall of the opening 222 is the second sliding surface 2211. A portion of the main surface on the periphery of the opening 222 is the second limiting surface 2212. Or, the opening 222 is provided with an extending portion extending outwardly along the inner wall of the opening 222 on the connecting plate 22. The inner wall of the extending portion is the second sliding surface 2211. The main surface of the extending portion connected to the inner wall of the opening 222 is the second limiting surface 2212. The limiting block 122 cooperatively connected to the limiting plate 221 can be entirely arranged in the opening 222 by disposing the limiting plate 221 on the inner wall of the opening 222, which reduces the overall thickness of the wall-mounted structure in a direction perpendicular to the plate body 121, reduces the amount of material used in the wall-mounted structure, and thus reduces costs.

Optionally, the connecting plate 22 is further provided with a first limiting structure 2213 and a second limiting structure 2214 at two ends of the limiting plate 221. The first limiting structure 2213 and the second limiting structure 2214 are configured to limit a rotation range of the connecting plate 22 relative to the wall-mounted plate 12.

As shown in FIG. 16, exemplarily, one end of the limiting plate 221 is provided with a first limiting structure 2213. In this case, the first limiting structure 2213 is the inner wall of the opening 222 at one end of the circular-arc of the second sliding surface 2211 for abutting the other end of the limiting block 122. The limiting block 122 abuts the first limiting structure 2213. In this case, the connecting plate 22 is in a first display state, for example, a horizontal display state.

Figure 17:
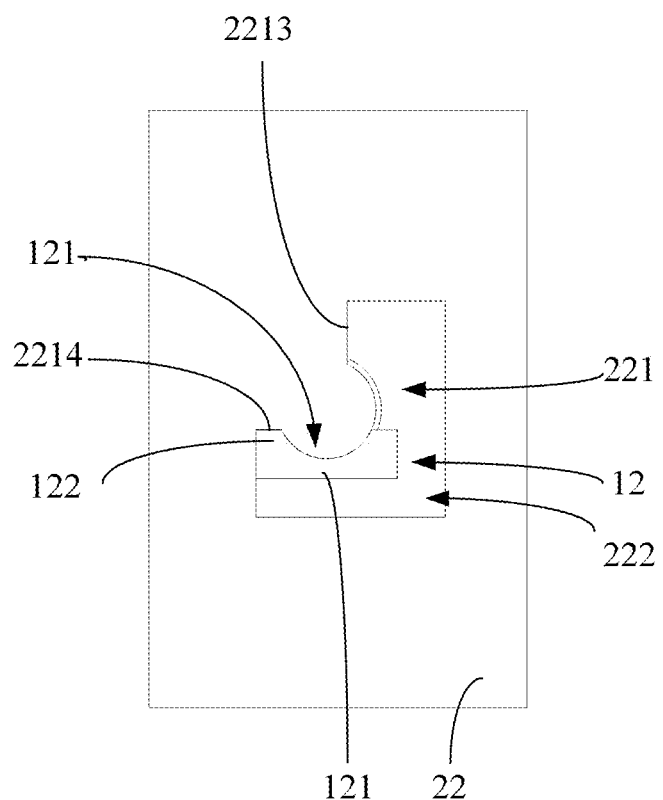
FIG. 17 is a structural diagram of another limiting block contacting another limiting structure according to an embodiment of the present disclosure.

FIG. 17 is a structural diagram of another limiting block contacting another limiting structure according to an embodiment of the present disclosure. As shown in FIG. 17, the other end of the limiting plate 221 is provided with a second limiting structure 2214. In this case, the second limiting structure 2214 is the inner wall of the opening 222 at the other end of the circular-arc of the second sliding surface 2211 for abutting the other end of the limiting block 122. The limiting block 122 abuts the second limiting structure 2214. In this case, the connecting plate 22 is in a second display state, for example, a vertical display state.

It should be noted that similar to the situation where in the first type of wall-mounted structure, in the case that the limiting block 112 slides from a state of abutting the first limiting structure 2113 to a state of abutting the second limiting structure 2114, the rotation angle of the connecting plate 21 relative to the wall-mounted plate 11 can be adjusted according to the user's needs; in the case that the limiting block 122 slides from a state of abutting the first limiting structure 2213 to a state of abutting the second limiting structure 2214, the rotation angle of the connecting plate 22 relative to the wall-mounted plate 12 can also be adjusted according to the user's needs.

Optionally, at least one of the plate body 121 and the limiting block 122 is provided with a reinforcing rib. In the case that the electronic device connected to the connecting plate 22 is heavy, the wall-mounted plate 12 on which the connecting plate 22 is mounted may have a problem of being crushed by the connecting plate 22 if the rigidity is insufficient. By providing the reinforcing rib on the wall-mounted plate 12, the rigidity of the wall-mounted plate 12 can be improved, thereby increasing the weight of the electronic device that the wall-mounted structure can bear, and improving the versatility of the wall-mounted structure. For the distribution method of the reinforcing rib, reference may be made to the related description in FIG. 5.

Optionally, the wall-mounted plate 12 is provided with at least one of a trace hole and a wall-mounted hole. The trace hole is convenient for traces such as cables of electronic equipment. The wall-mounted hole is convenient for fixing the wall-mounted plate. Corresponding trace holes and wall-mounted holes can be arranged in the wall-mounted plate 12 according to the user's needs and the form of the electronic device connected to the connecting plate 22 to further improve the versatility of the wall-mounted structure. For the distribution of the trace holes and the wall-mounted holes, reference may be made to the related description in FIG. 5.

Optionally, the connecting plate 22 is provided with a plurality of electronic device connecting structures. For example, the electronic device connecting structure may be a connecting hole. By providing a plurality of connecting holes, different connecting holes can be selected for different electronic devices for corresponding connections, which further increases the versatility of the wall-mounted structure. For the distribution of the connecting structure, reference may be made to the related description in FIG. 5.

Optionally, the wall-mounted plate 12 is a plastic part or a metal part. The plastic part has insulation, light weight, and low material cost. The metal parts has high strength and is not easily deformed. The wall-mounted plate 12 is fabricated by a corresponding material according to the electronic device actually connected to the wall-mounted structure, as long as the connecting plate 22 connecting the electronic device is rotatable relative to the wall-mounted plate 12 to achieve the display state required by the user, which is not limited in the present disclosure.

Figure 18:
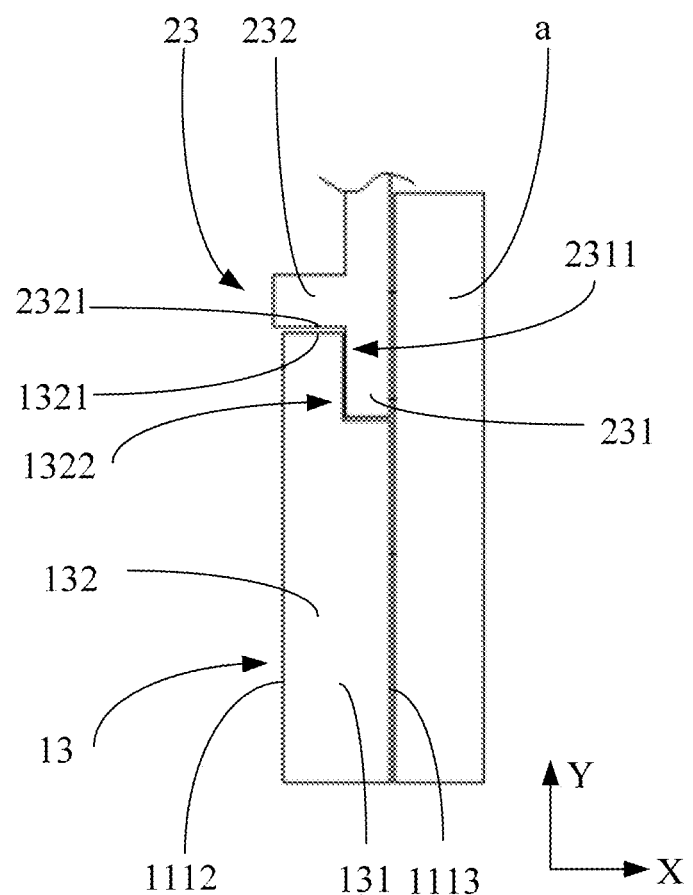
FIG. 18 is a structural cross-sectional view of yet another wall-mounted structure according to an embodiment of the present disclosure.

FIG. 18 is a structural cross-sectional view of yet another wall-mounted structure according to an embodiment of the present disclosure. As shown in FIG. 18, the present disclosure also provides a wall-mounted structure similar to the structure of the first type of wall-mounted structure shown in FIG. 1. The difference lies in that in this embodiment, the third sliding surface 1321 on the top end surface of the limiting block 132 is slidably connected to the corresponding fourth sliding surface 2321 on the arc-shaped slide rail 231, such that the connecting plate 23 rotates relative to the wall-mounted plate 13 in a plane parallel to the plate body 131.

Figure 19:
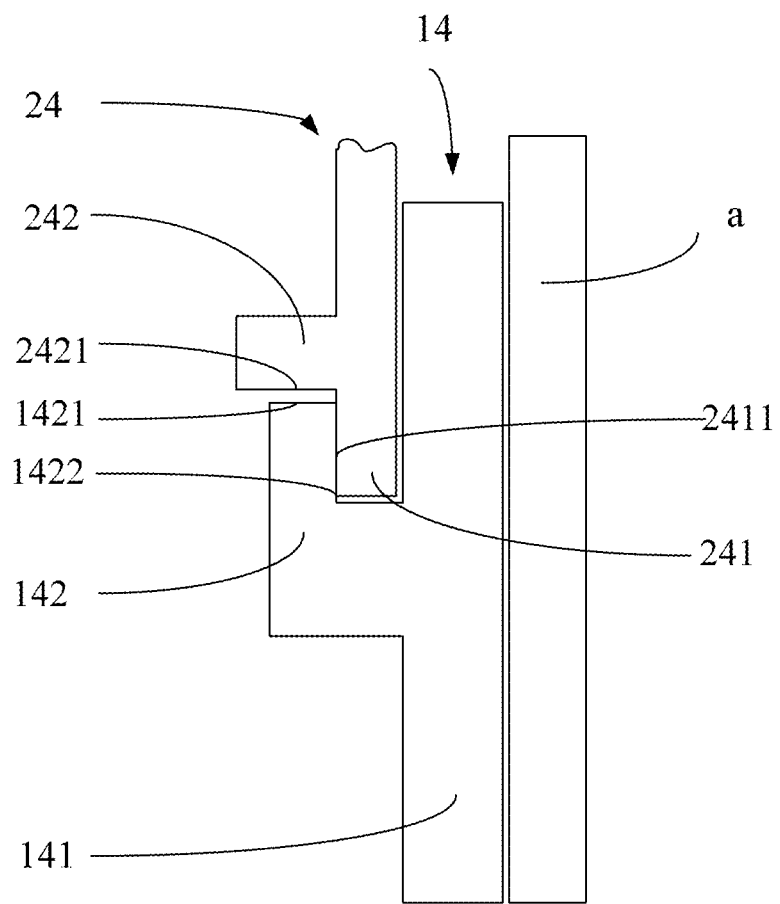
FIG. 19 is a structural cross-sectional view of yet another wall-mounted structure according to an embodiment of the present disclosure.

FIG. 19 is a structural cross-sectional view of yet another wall-mounted structure according to an embodiment of the present disclosure. As shown in FIG. 19, the present disclosure also provides a wall-mounted structure similar to the structure of the second type of wall-mounted structure shown in FIG. 15. The difference lies in that in this embodiment, the third sliding surface 1421 on the top end face of the limiting block 142 is slidably connected to the corresponding fourth sliding surface 2421 on the arc-shaped slide rail 241, such that the connecting plate 24 rotates relative to the wall-mounted plate 14 in a plane parallel to the plate body 141.

An embodiment of the present disclosure also provides an electronic device, which may include a wall-mounted structure as shown in FIGS. 1 to 14, 15 to 17, 18 or 19. The electronic device can enable the body of the electronic device to correspond to the connecting hole provided in the connecting plate, can be fixedly connected to the connecting plate by a bolt, plug connection, etc., and mounted on a wall by a wall-mounted plate connected to the wall. Since the connecting plate of the wall-mounted structure is rotatable relative to the wall-mounted plate, the user can adjust the display state of the electronic device by rotating the electronic device.

Exemplarily, electronic devices include, but are not limited to, electronic photo frames, televisions, and the like.

The above are only optional embodiments of the present disclosure and are not intended to limit the present disclosure. Any modification, equivalent replacement, improvement, etc. made within the spirit and principle of the present disclosure shall be included in the scope of protection of the present disclosure.

What is claimed is:

1. A wall-mounted structure, comprising: a wall-mounted plate fixable on a wall and a connecting plate connectable to an electronic device, wherein the wall-mounted plate comprises a plate body, a limiting block on a top end surface of the plate body, a reinforcing rib on a side of at least one of the limiting block and the plate body, and a trace hole in the plate body, wherein the top end surface of the plate body is provided with a first sliding surface extending in an arc shape, and the limiting block is provided with a first limiting surface connected to the first sliding surface;

the connecting plate comprises a limiting plate provided with at least a bottom end surface and two main surfaces connected to two sides of the bottom end surface, wherein the bottom end surface is a second sliding surface extending in an arc shape, one of the two main surfaces of the limiting plate is a second limiting surface connected to the second sliding surface, the second limiting surface extending from one end to the other end of the limiting plate;

wherein the limiting plate is configured such that the second sliding surface is disposed on the first sliding surface, the second limiting surface is opposite to the first limiting surface, and the limiting plate is slidable to enable the connecting plate to be rotatable relative to the wall-mounted plate in a plane parallel to the plate body.

2. The wall-mounted structure according to claim 1, wherein the limiting block is in a shape of a plate, and the limiting block extends from one end to the other end of the first sliding surface.

3. The wall-mounted structure according to claim 1, wherein the plate body is provided with a first main surface, wherein the first limiting surface of the limiting block is parallel to the first main surface.

4. The wall-mounted structure according to claim 1, wherein the first sliding surface is one of a circular-arc surface protruding from the plate body and a circular-arc surface recessed in the plate body.

5. The wall-mounted structure according to claim 1, wherein the wall-mounted plate is an axisymmetric structure, and the first sliding surface is symmetrical with respect to an axis of symmetry of the wall-mounted plate.

6. The wall-mounted structure according to claim 1, wherein the connecting plate is provided with an opening, the limiting plate is a portion of the connecting plate proximal to the opening, wherein the second sliding surface and the second limiting surface are one of the following structures:
   an inner wall of the opening is the second sliding surface, and a portion of the main surface distal from the wall on the periphery of the opening is the second limiting surface; and
   the opening is provided with an extending portion extending outward along the inner wall of the opening on the connecting plate, wherein the inner wall of the extending portion is the second sliding surface, and the main surface of the extending portion connected to the inner wall of the opening is the second limiting surface.

7. The wall-mounted structure according to claim 6, wherein the limiting block is further provided with a top surface connected to the first limiting surface, wherein the top surface is a circular-arc surface parallel to the first sliding surface, and the inner wall of the opening is a circular-arc surface matching the top surface.

8. The wall-mounted structure according to claim 1, wherein the connecting plate is further provided with a first limiting structure and a second limiting structure at two ends of the limiting plate, wherein the first limiting structure and the second limiting structure are configured to limit a rotation range of the connecting plate relative to the wall-mounted plate.

9. The wall-mounted structure according to claim 8, wherein the first sliding surface is one of a protruding circular-arc surface and a recessed circular-arc surface; wherein
   in a case that the first sliding surface is the protruding circular-arc surface, a circular-arc of the first sliding surface corresponds to a central angle of 90 degrees, and a circular-arc of the second sliding surface corresponds to a central angle of 180 degrees;
   in a case that the first sliding surface is the recessed circular-arc surface, a circular-arc of the first sliding surface corresponds to a central angle of 180 degrees, and a circular-arc of the second sliding surface corresponds to a central angle of 270 degrees.

10. The wall-mounted structure according to claim 1, wherein the first limiting surface and the second limiting surface are correspondingly provided with mutually engaged snap protrusions; and the snap protrusions extend in an arc shape along the first limiting surface and the second limiting surface, respectively.

11. The wall-mounted structure according to claim 1, wherein the first limiting surface is provided with a plurality of strip-shaped reinforcing ribs, the plurality of strip-shaped reinforcing ribs being evenly spaced along a length direction of the first limiting surface.

12. The wall-mounted structure according to claim 1, wherein the reinforcing ribs on the plate body include an annular reinforcing rib and an asterisk-shaped reinforcing rib, a center of the asterisk-shaped reinforcing rib and a center of the annular reinforcing rib coinciding.

13. An electronic device, comprising at least one of a wall-mounted structure:
   the wall-mounted structure as defined in claim 1.

14. A wall-mounted structure, comprising: a wall-mounted plate fixable on a wall and a connecting plate connectable to an electronic device, wherein
   the wall-mounted plate comprises a plate body, a limiting block on a top end surface of the plate body, a reinforcing rib on a side of at least one of the limiting block and the plate body, and a trace hole in the plate body, wherein the limiting blocking is provided with a first limiting surface and a first sliding surface extending in an arc shape, the first sliding surface being connected between the first limiting surface and the plate surface of the plate body;
   the connecting plate comprises a limiting plate provided with at least a bottom end surface and two main surfaces connected to two sides of the bottom end surface, wherein the bottom end surface is a second sliding surface extending in an arch shape, one of the main surfaces of the limiting plate is a second limiting surface connected to the second sliding surface, the second limiting surface extending from one end to the other end of the limiting plate;
   wherein the limiting plate is configured such that the second sliding surface is disposed on the first sliding surface, the second limiting surface is opposite to the first limiting surface, and the limiting plate is slidable to enable the connecting plate to be rotatable relative to the wall-mounted plate in a plane parallel to the plate body.

15. The wall-mounted structure according to claim 14, wherein the first sliding surface is one of a protruding circular-arc surface and a recessed circular-arc surface.

16. The wall-mounted structure according to claim 15, wherein the connecting plate is provided with an opening, the limiting plate is a portion of the connecting plate proximal to the opening, wherein the second sliding surface and the second limiting surface are one of the following structures:
   an inner wall of the opening is the second sliding surface, and a portion of the main surface distal from the wall on the periphery of the opening is the second limiting surface; and
   the opening is provided with an extending portion extending outward along the inner wall of the opening on the connecting plate, wherein the inner wall of the extending portion is the second sliding surface, and the main surface of the extending portion connected to the inner wall of the opening is the second limiting surface.

17. The wall-mounted structure according to claim 14, wherein the connecting plate is further provided with a first limiting structure and a second limiting structure at two ends of the limiting plate, wherein the first limiting structure and the second limiting structure are configured to limit a rotation range of the connecting plate relative to the wall-mounted plate.

18. The wall-mounted structure according to claim 17, wherein the first sliding surface is one of a protruding circular-arc surface and a recessed circular-arc surface; wherein
   in a case that the first sliding surface is the protruding circular-arc surface, a circular-arc of the first sliding surface corresponds to a central angle of 90 degrees, and a circular-arc of the second sliding surface corresponds to a central angle of 180 degrees;
   in a case that the first sliding surface is the recessed circular-arc surface, a circular-arc of the first sliding surface corresponds to a central angle of 180 degrees, and a circular-arc of the second sliding surface corresponds to a central angle of 270 degrees.

19. A wall-mounted structure, comprising: a wall-mounted plate fixable on a wall and a connecting plate connectable to an electronic device, wherein
   the wall-mounted plate comprises a plate body, a limiting block on a top end surface of the plate body, a reinforcing rib on a side of at least one of the limiting block and the plate body, and a trace hole in the plate body, wherein the top end surface of the plate body is provided with a third sliding surface extending in an arc shape, and the limiting block is further provided with a first limiting surface connected to the third sliding surface and the top end surface of the plate body;
   the connecting plate comprises a limiting plate and an arc-shaped slide rail provided with a fourth sliding surface, wherein the limiting plate is provided with a second limiting surface connected to the fourth sliding surface, the second limiting surface extending from one end to the other end of the limiting plate;
   wherein the connecting plate is configured such that the fourth sliding surface is disposed on the third sliding surface, the second limiting surface is opposite to the first limiting surface, and the arc-shaped slide rail is slidable to enable the connecting plate to be rotatable relative to the wall-mounted plate in a plane parallel to the plate body.

\* \* \* \* \*